Sept. 27, 1955     C. A. BAYES ET AL     2,719,047
JOINT BETWEEN WINDSHIELD WIPER AND SHAFT
Filed June 16, 1949     3 Sheets-Sheet 1
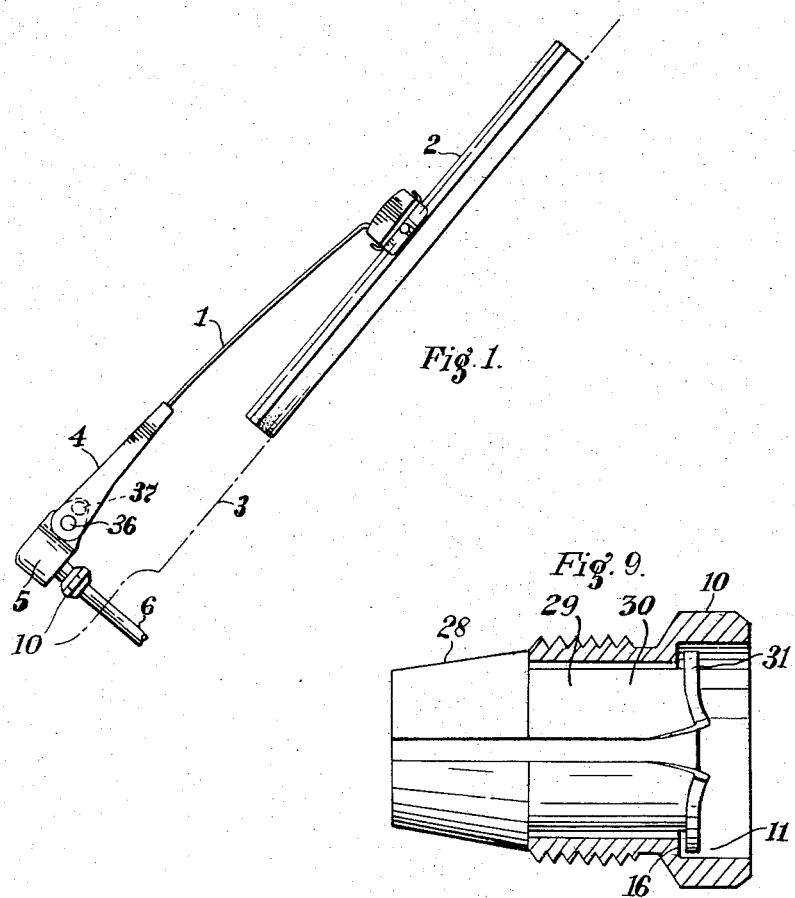
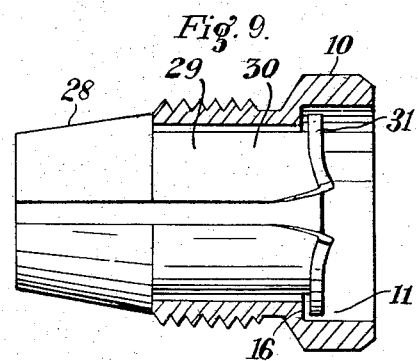
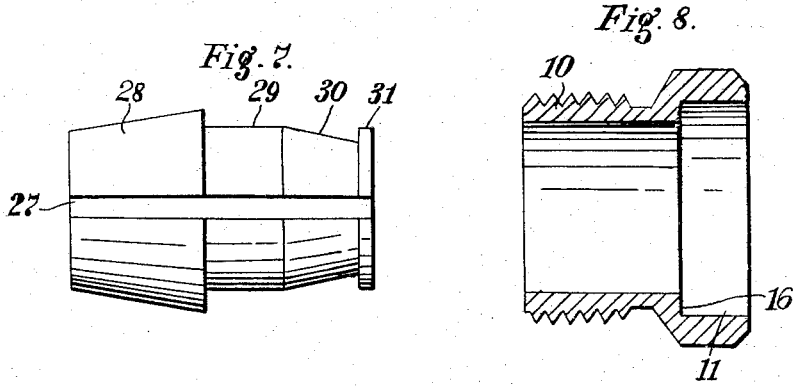
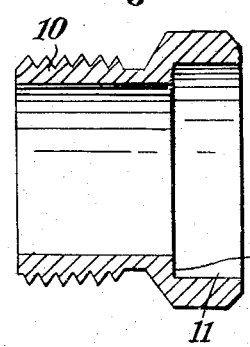
Inventors
Charles Authur Bayes & Horace Bernard Pyne
By
Bean, Brooks, Buckley & Bean
Attorneys

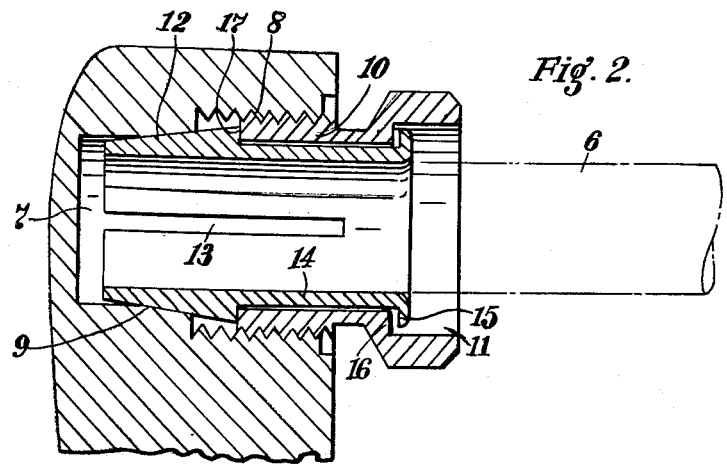
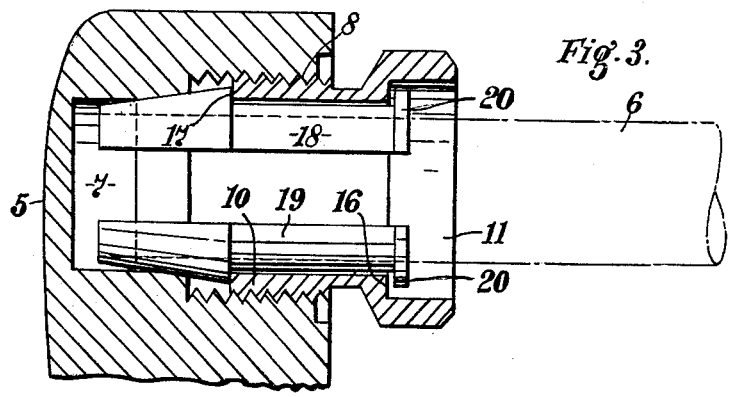
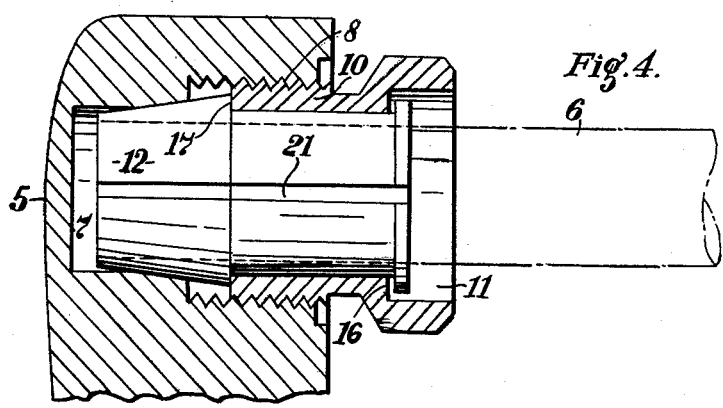

Sept. 27, 1955 C. A. BAYES ET AL 2,719,047
JOINT BETWEEN WINDSHIELD WIPER AND SHAFT
Filed June 16, 1949 3 Sheets-Sheet 3

Inventors
Charles Authur Bayes &
Horace Bernard Pyne

Bean, Brooks, Buckley & Bean
Attorneys

United States Patent Office 2,719,047
Patented Sept. 27, 1955

2,719,047

JOINT BETWEEN WINDSHIELD WIPER AND SHAFT

Charles Arthur Bayes, Petts Wood, and Horace Bernard Pyne, Edgware, England, assignors to Trico Products Corporation, Buffalo, N. Y., a corporation of New York Application June 16, 1949, Serial No. 99,404

2 Claims. (Cl. 287—53)

This invention relates to a windscreen wiper, in which an arm which carries the wiper blade is mounted upon an oscillatable spindle and the invention is concerned, more particularly, with the means by which the arm is mounted upon the spindle.

The mounting means with which the invention is concerned is of the kind which comprises a collar, preferably of metal, which engages in a mounting socket in the arm and around the end of the spindle and is pressed into contact both with the spindle and with the wall of the mounting socket by means of a nut or sleeve which screws into the mounting socket.

In mounting means of the kind aforesaid, the mounting socket may extend right through the arm in which case the spindle is inserted through the inner end and the nut is screwed into the socket from the outer end of the socket. Alternatively, the mounting socket may extend into the arm from the under side of the arm without breaking into the outer surface of the arm, in which case the nut is provided with an axial bore through which the spindle is passed and the nut is screwed into the opening of the mounting socket in the under side of the arm. Usually the collar is split longitudinally and has a conical or tapered outer surface which engages a complementary surface of the mounting socket.

In mounting means of this kind the collar becomes firmly fixed between the spindle and the wall of the mounting socket and it is found that there may be difficulty in removing the arm from the spindle when this is necessary. The object of the present invention is to obviate this difficulty and to enable the arm to be readily detached from the spindle.

To this end, in accordance with the invention, the collar is connected to the nut in such a manner that it is not rotatable relatively to the nut or sleeve but moves in an axial direction with the nut when the nut is screwed up and unscrewed.

The invention may be carried into effect in various ways. According to one preferred arrangement, the nut is provided with an axial bore and with a recess in its head, the diameter of the recess being greater than that of the bore so as to form a circular shoulder. The collar is then provided with an axial extension comprising a part adjacent the end of the collar of substantially the same diameter as the bore in the nut, and adjacent thereto an inwardly tapering part terminating in an outwardly extending flange the diameter of which is substantially the same as that of the bore in the nut. To connect the collar to the nut, the axial extension is inserted into the bore in the nut and the tapering part is then bent outwardly until the flange engages over the shoulder in the head of the nut. In this position the inner end of the nut engages a shoulder formed where the extension meets the wider end of the conical collar, which end is of a greater diameter than the extension, so that the collar is securely attached to the nut but is nevertheless rotatable relatively to the nut.

The invention comprises also a method of attaching a conical collar to a nut provided with an axial bore according to which the collar is provided with an axial extension which tapers inwardly and has at its outer end an outwardly extending flange, and the extension and flange are passed through the bore in the nut after which the tapered part is bent outwardly so as to cause the flange to engage in a recess in the head of the nut of greater diameter than the bore.

In order that the invention may be easily understood and readily carried into effect, various forms of mounting means in accordance with the invention are illustrated, by way of example, in the accompanying drawings, in which:

Figure 1 is a general elevational view showing the windscreen wiper attached to its actuating spindle;

Figures 2-6 are sectional views through the mounting socket showing different means for attaching the collar to the nut;

Figure 7 is an elevational view of a further form of collar;

Figure 8 is a cross-section through the nut to be used with the collar of Figure 7;

Figure 9 is a part sectional view showing the collar of Figure 7 and the nut of Figure 8 connected together.

Figure 5:
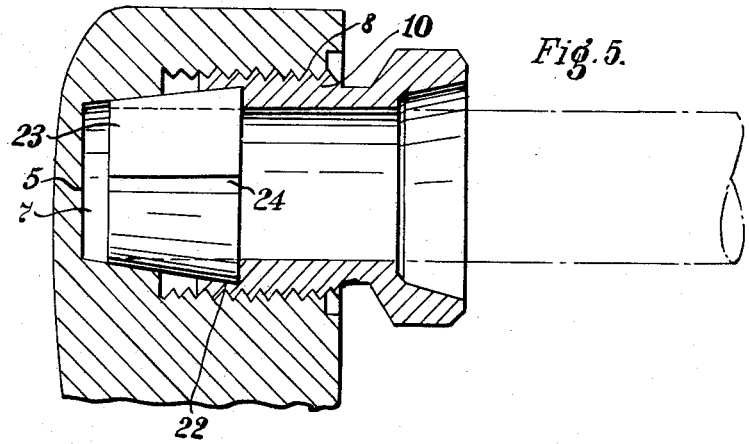

Referring to the drawings, the numeral 1 designates a windscreen wiper arm which carries the wiper blade 2 which is moved backwards and forward over the surface of the windscreen 3. The arm 1 comprises an outer arm section 4 and an inner section 5 to which the outer section 4 is pivotally connected by a pin 36 and the outer section is urged towards the windscreen by means of a leaf spring (which is not visible in the drawing) of which one end is secured to the outer section 4 and the opposite end bears against a pin 37 carried by the inner section 5. The construction of the arm and the means for mounting the blade 2 therein, with which the present invention is not concerned, may differ from that illustrated in the drawing.

The arm 1 is oscillated backwards and forwards across the surface of the windscreen by means of a shaft or spindle 6 which is rotated backwards and forwards by known means, and the present invention relates to the means whereby the arm 1 is mounted on the oscillating spindle 6. For this purpose, in the embodiment illustrated in Figure 2, the inner arm section 5 is formed on the underside with a mounting socket 7 which is screw-threaded as at 8 at its outer end and formed adjacent thereto with a conical or tapered portion 9 of smaller diameter. For mounting the arm 1 on its actuating shaft 6, there is provided a nut 10 which has a central bore terminating in a recess 11 of greater diameter than the bore at its outer end. In the conical part 9 of the mounting socket there is disposed a collar 12 which is split axially as at 13 and is of tapered or conical form. Adjacent the conical part the collar has a reduced stem 14. In order to connect the collar to the nut, the reduced stem 14 is passed through the bore of the nut and its end 15 is then spun over so as to engage a shoulder 16 formed in the nut owing to the recess 11.

The inner end of the nut then engages a shoulder 17 of the collar, so that, when the nut is turned, the nut and collar move axially as a unit but the nut is rotatable relatively to the collar.

In order to attach the inner arm section 5 to its actuating spindle 6, the end of the spindle is passed through the collar and the nut is screwed into the thread 8 of the mounting socket, whereby the collar is moved axially with the nut and contracted into engagement with the spindle 6. In order to remove the arm from the spindle, it is merely necessary to unscrew the nut 8, whereby the collar is withdrawn and the arm 1 is freed from the spindle.

The arrangement of Figure 3 is similar to that of Figure 2, the only difference being that the collar 9 is made in two separate parts 18 and 19. The flanged ends 20 can therefore be formed on the parts of the collar before the parts are introduced into the bore of the nut. Alternatively, the collar, instead of being made in two separate parts, may be provided with an axial slit 21 which extends throughout its length, as shown in Figure 4. The collar is then sprung into the bore of the nut 10, and thereby attached to the nut so as to move axially therewith and at the same time to be rotatable relatively thereto. If necessary the flange may be removed over a certain part of its periphery in order to enable it to pass through the bore.

In the form of construction illustrated in Figure 5 the nut 10 is provided at its inner end with a conical recess 22 into which a conical collar 23 which is split axially as shown at 24, is sprung. It will be clear that, with this form of construction, the collar again moves axially with the nut when the latter is screwed up and unscrewed.

Figure 6:
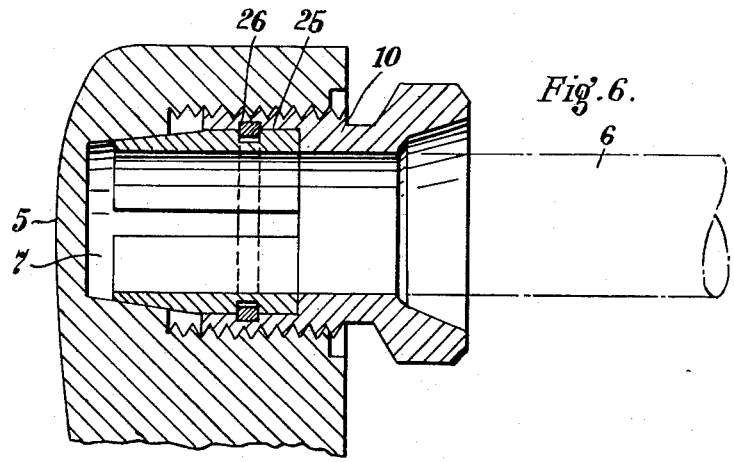

The form of construction illustrated in Figure 6 is similar to that of Figure 5 except that the recess 25 provided at the inner end of the nut is not of conical or tapering form, but is cylindrical and the part of the collar which engages in the recess 25 is of similar cylindrical form. The collar is held in position in the recess 25 by means of a spring retainer or split ring 26 which engages in a peripheral groove in the collar and in a corresponding groove in the recess in the nut, sufficient clearance being provided to allow the ring to collapse sufficiently to pass into the recess 25. In this form again, the nut and collar are connected together so as to be relatively rotatable but not relatively axially movable.

In the form of construction illustrated in Figures 7–9, the collar, which has a longitudinal slit 27 has a tapered or conical end portion 28. Adjacent to the conical portion 28 is a cylindrical portion 29 the diameter of which is slightly less than the diameter of the bore of the nut, and adjacent to the portion 29 is an inwardly tapering portion 30 which terminates in a flange 31.

The diameter of the flange 31 is approximately equal to that of the portion 29, so that the flange will pass through the bore in the nut 10. In order to attach the collar to the nut 10, the parts 29, 30 and 31 are introduced into the bore of the nut, after which the part 30 is expanded by introducing a suitable tool into the collar until the flange 31 engages the shoulder 16 formed by the recess 11 in the head of the nut as shown in Figure 9. The nut and collar are used to attach the spindle 6 to the mounting socket in the same manner as previously described.

The taper of the portion 30 of the collar is preferably such that, when the collar is expanded, the portions 29 and 30 are of uniform diameter, as shown in Figure 9.

Figure 10:
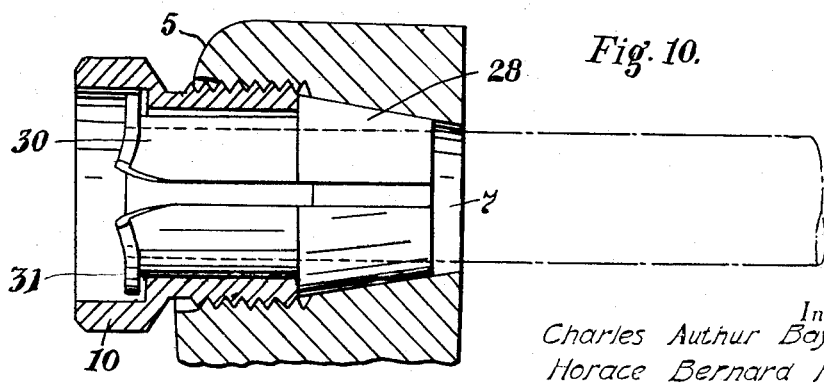
Figure 10 is a sectional view similar to Figures 2-6, showing the nut screwed into the mounting socket from the outside.

Figure 10 shows an arrangement similar to that shown in the previous figures, the chief difference being that the nut 10 to which the collar 28 is connected in the manner described in connection with Figures 7–9 is screwed from the outside into the mounting socket 7 of the inner arm section 5. The mounting socket is also open to the underside of the arm to enable the oscillating shaft to be introduced into the collar in the mounting socket.

It will be seen that the form of the collar shown in Fig. 10 and its connection to the nut or sleeve 10 is the same as the form shown in Fig. 9. Thus the method of making the interconnection between the nut and the collar may be the same as described with reference to Figs. 7–9, with the flange 31 having been expanded to the nut engaging position shown by expansion of the collar extension portion 30 from a previously tapered position as shown in Fig. 7.

We claim:

1. Means for fixing the blade-carrying arm of a windscreen wiper to its actuating spindle comprising a mounting socket in the arm, said mounting socket having an inner conical part and an outer cylindrical threaded part opening to the underside of the arm, a collar having a split conical portion engageable in said conical part from the underside of the arm, a sleeve having an externally threaded portion adapted to screw into said threaded part from the underside of the arm to engage the wider end of said conical portion, said sleeve having a radially flared head portion at its outer end and an unthreaded tubular shank portion interconnecting said threaded portion and said head portion, said head portion having tool bearing surfaces about the side thereof, said sleeve having an axial bore therethrough joining with a larger diameter recess in said head portion with a radial shoulder, a hollow cylindrical extension on said wider end of said conical portion of the collar, the diameter of said extension being less than that of said wider end, said extension passing through said bore in said sleeve and receiving said spindle, and a radially projecting flange portion at the outer end of said collar extension engaging entirely within said recess, said wider end of said conical portion and said flange portion embracing said sleeve at the opposite ends of said bore with a small axial clearance, said conical portion being dimensioned to seat with a substantial portion of its conical face in said conical part of said socket under the driving force of the sleeve and to grasp said spindle by and upon such seating.

2. A conical collar for fixing the blade-carrying arm of a windscreen wiper to its actuating spindle, said collar comprising a frustro-conical part and a generally cylindrical extension at the wider end of said conical part, said extension being of smaller diameter than said wider end and being inwardly tapered toward its outer end, the inwardly tapered portion of said extension terminating in an outward projection of substantially the same radial extent as the larger end of said tapered portion, said collar having a longitudinal slit extending throughout its length whereby said conical part may be inwardly compressed and said tapered portion may be outwardly expanded.

References Cited in the file of this patent

UNITED STATES PATENTS

| Number | Name | Date |
|---|---|---|
| 91,907 | Burnett | June 29, 1869 |
| 1,365,357 | Twiss | Jan. 11, 1921 |
| 2,013,732 | Marvin | Sept. 10, 1935 |
| 2,258,377 | Collins | Oct. 7, 1941 |
| 2,279,508 | Bergan | Apr. 14, 1942 |
| 2,376,714 | Mussen | May 22, 1945 |
| 2,447,299 | Williams | Aug. 17, 1948 |
| 2,527,988 | Dillon | Oct. 31, 1950 |

FOREIGN PATENTS

| Number | Country | Date |
|---|---|---|
| 431,083 | Great Britain | July 1, 1935 |
| 497,366 | Great Britain | Dec. 19, 1938 |
| 578,515 | Great Britain | July 2, 1946 |